United States Patent
Moon et al.

(10) Patent No.: US 10,427,546 B2
(45) Date of Patent: Oct. 1, 2019

(54) VEHICLE AND A CONTROL METHOD THEREOF

(71) Applicants: HYUNDAI MOTOR COMPANY, Seoul (KR); KIA MOTORS CORPORATION, Seoul (KR)

(72) Inventors: Sanghoon Moon, Yongin-si (KR); Jung Shik Kim, Seoul (KR); Yeonho Kim, Suwon-si (KR); YoungJin Shin, Changwon-si (KR); Kyungsoo Park, Daejeon (KR); Hyoungjun Cho, Suwon-si (KR); WoongChan Chae, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/897,575

(22) Filed: Feb. 15, 2018

(65) Prior Publication Data

US 2019/0135118 A1    May 9, 2019

(30) Foreign Application Priority Data

Nov. 3, 2017   (KR) .................. 10-2017-0145630

(51) Int. Cl.
| | | |
|---|---|---|
| *H02P 3/00* | (2006.01) | |
| *H02P 3/14* | (2006.01) | |
| *H02P 3/18* | (2006.01) | |
| *B60L 53/20* | (2019.01) | |
| *H02P 6/10* | (2006.01) | |
| *H02P 6/16* | (2016.01) | |
| *H02P 6/24* | (2006.01) | |
| *H02K 1/27* | (2006.01) | |
| *H02M 7/5387* | (2007.01) | |
| *B60L 50/51* | (2019.01) | |
| *H02K 1/16* | (2006.01) | |
| *B60L 53/14* | (2019.01) | |
| *H02K 11/21* | (2016.01) | |

(52) U.S. Cl.
CPC .............. *B60L 53/20* (2019.02); *B60L 50/51* (2019.02); *H02K 1/16* (2013.01); *H02K 1/276* (2013.01); *H02K 1/2766* (2013.01); *H02M 7/5387* (2013.01); *H02P 6/10* (2013.01); *H02P 6/16* (2013.01); *H02P 6/24* (2013.01); *B60L 53/14* (2019.02); *B60L 2210/40* (2013.01); *B60L 2220/14* (2013.01); *H02K 11/21* (2016.01)

(58) Field of Classification Search
CPC ......................... B60L 11/1811; B60L 11/1803
USPC ................................................. 318/375, 139
See application file for complete search history.

(56) References Cited

U.S. PATENT DOCUMENTS

8,120,291 B2 * 2/2012 Clark ..................... B60L 3/108
                                                      318/139
9,211,795 B2 * 12/2015 Kimoto ................... B60L 53/55
(Continued)

*Primary Examiner* — Erick D Glass
(74) *Attorney, Agent, or Firm* — Lempia Summerfield Katz LLC (57) ABSTRACT

A vehicle includes: a motor including a stator and a rotor; an inverter configured to drive the motor; a battery, which is rechargeable; and a controller configured to change a position of the rotor based on whether the position of the rotor is identical to a predetermined position. Additionally, the controller is configured to control the inverter such that the battery is charged after the position of the rotor changes.

20 Claims, 8 Drawing Sheets

(56) References Cited

U.S. PATENT DOCUMENTS

| | | | |
|---|---|---|---|
| 9,973,122 B2* | 5/2018 | Uetsuji | B60L 11/04 |
| 2004/0035656 A1* | 2/2004 | Anwar | B60L 7/26 |
| | | | 188/161 |
| 2007/0194733 A1* | 8/2007 | Kurokochi | B60G 21/0556 |
| | | | 318/376 |
| 2009/0025992 A1* | 1/2009 | Hayashi | B60K 6/445 |
| | | | 180/65.265 |
| 2011/0040519 A1* | 2/2011 | Yeh | H02P 6/16 |
| | | | 702/145 |

* cited by examiner

VEHICLE AND A CONTROL METHOD THEREOF

CROSS-REFERENCE TO RELATED APPLICATION

This application claims priority to and the benefit of Korean Patent Application No. 10-2017-0145630 filed on Nov. 3, 2017 in the Korean Intellectual Property Office, the disclosure of which is incorporated herein by reference in its entirety.

BACKGROUND

1. Field

The present disclosure relates to a vehicle traveling by using electric energy as a main energy source, and to a method of controlling the vehicle.

2. Description of the Related Art

In general, a vehicle is a mobile machine configured to move or transport people or goods. Such vehicles travel on roads or rails using fossil fuel, electricity, and the like as a power source.

Vehicles that use fossil fuel emit fine dust, water vapor, carbon dioxides, carbon monoxides, hydrocarbon, nitrogen, nitrogen oxides, and/or sulfur oxides, and the like when burning the fossil fuel. The water vapor and carbon dioxides are known to be the cause of global warming. The fine dust, carbon monoxides, hydrocarbon, nitrogen, nitrogen oxides, and/or sulfur oxides are known to be air pollution materials that can harm humans.

For this reason, recently, vehicles using eco-friendly energy capable of replacing fossil fuel are being developed. For example, an Electric Vehicle (EV) using electric energy as a main energy source is being developed.

The electric vehicle includes a high-voltage battery to store electric energy, a motor as a power generator and an inverter for driving the motor. Recently, the capacity of the battery has increased to improve the mileage and power consumption efficiency of the EV.

SUMMARY

Therefore, it is an aspect of the present disclosure to provide a vehicle capable of reducing noise and vibrations generated when charging a battery. It is another aspect of the present disclosure to provide a method of controlling such a vehicle.

Additional aspects of the disclosure will be set forth in part in the description which follows and, in part, will be obvious from the description, or may be learned by practice of the disclosure.

In accordance with one aspect of the present disclosure, a vehicle includes a motor including a stator and a rotor. The vehicle also includes an inverter configured to drive the motor and a battery which is rechargeable. The vehicle further includes a controller configured to change a position of the rotor based on whether the position of the rotor is identical to a predetermined position. The controller is also configured to control the inverter such that the battery is charged after the position of the rotor changes.

The vehicle may further include a sensor configured to detect the position of the rotor, wherein if the position of the rotor detected by the sensor is not identical to the predetermined position, the controller may change the position of the rotor such that the position of the rotor is identical to the predetermined position. Additionally, the controller may control the inverter such that the battery is charged after the position of the rotor changes.

If the position of the rotor detected by the sensor is not identical to a winding center of each phase of the stator, the controller may change the position of the rotor such that the position of the rotor is identical to the winding center of each phase of the stator. Additionally, the controller may control the inverter such that the battery is charged after the position of the rotor changes.

If the position of the rotor detected by the sensor is not identical to a position at which a cogging torque generated by the motor is smallest, the controller may change the position of the rotor such that the position of the rotor is identical to the position at which the cogging torque generated by the motor is smallest. Additionally, the controller may control the inverter such that the battery is charged after the position of the rotor changes.

If the position of the rotor detected by the sensor is not identical to a position at which torque ripples generated by the motor are smallest, the controller may change the position of the rotor such that the position of the rotor is not identical to the position at which the torque ripples generated by the motor are smallest. Additionally, the controller may control the inverter such that the battery is charged after the position of the rotor changes.

If a center position of a pole of the rotor is not identical to the predetermined position, the controller may change the position of the rotor such that the center position of the pole of the rotor is identical to the predetermined position. Additionally, the controller may control the inverter such that the battery is charged after the position of the rotor changes.

If the center position of the pole of the rotor is not identical to a winding center of each phase of the stator, the controller may change the position of the rotor such that the center position of the pole of the rotor is identical to the winding center of each phase of the stator. Additionally, the controller may control the inverter such that the battery is charged after the position of the rotor changes.

If the center position of the pole of the rotor is not identical to a position at which a cogging torque generated by the motor is smallest, the controller may change the position of the rotor such that the center position of the pole of the rotor is identical to the position at which the cogging torque generated by the motor is smallest. Additionally, the controller may control the inverter such that the battery is charged after the position of the rotor changes.

If the center position of the pole of the rotor is not identical to a position at which torque ripples generated by the motor are smallest, the controller may change the position of the rotor such that the center position of the pole of the rotor is identical to the position at which the torque ripples generated by the motor are smallest. Additionally, the controller may control the inverter such that the battery is charged after the position of the rotor changes.

If the rotor stops and a voltage for charging is applied to a neutral point of windings of the motor, the controller may control the inverter to boost the applied voltage using the motor and the inverter.

In accordance with another aspect of the present disclosure, a method of controlling a vehicle includes detecting a position of a rotor and changing the position of the rotor based on whether the position of the rotor is identical to a predetermined position. The method further includes starting the charging of a battery after the position of the rotor changes.

The changing of the position of the rotor may include, if the position of the rotor is not identical to the predetermined position, changing the position of the rotor such that the position of the rotor is identical to the predetermined position.

The changing of the position of the rotor may include if the position of the rotor is not identical to a winding center of each phase of a stator, changing the position of the rotor such that the position of the rotor is identical to the winding center of each phase of the stator.

The changing of the position of the rotor may include, if the position of the rotor is not identical to a position at which a cogging torque generated by a motor is smallest, changing the position of the rotor such that the position of the rotor is identical to the position at which the cogging torque generated by the motor is smallest.

The changing of the position of the rotor may include, if the position of the rotor is not identical to a position at which torque ripples generated by a motor are smallest, changing the position of the rotor such that the position of the rotor is identical to the position at which the torque ripples generated by the motor are smallest.

The detecting of the position of the rotor may include detecting a center position of a pole of the rotor. The changing of the position of the rotor may include, if the center position of the pole of the rotor is not identical to the predetermined position, changing the position of the rotor such that the center position of the pole of the rotor is identical to the predetermined position.

The changing of the position of the rotor may include, if the center position of the pole of the rotor is not identical to a winding center of each phase of a stator, changing the position of the rotor such that the center position of the pole of the rotor is identical to the winding center of each phase of the stator.

The changing of the position of the rotor may include, if the center position of the pole of the rotor is not identical to a position at which a cogging torque generated by the motor is smallest, changing the position of the rotor such that the center position of the pole of the rotor is identical to the position at which the cogging torque generated by the motor is smallest.

The changing of the position of the rotor may include, if the center position of the pole of the rotor is not identical to a position at which torque ripples generated by the motor are smallest, changing the position of the rotor such that the center position of the pole of the rotor is identical to the position at which the torque ripples generated by the motor are smallest.

The starting of the charging of the battery may include stopping the rotor and applying a voltage for charging to a neutral point of windings of a motor. The starting of the charging of the battery may further include boosting the applied voltage using the motor and an inverter.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The present disclosure is described more fully hereinafter with reference to the accompanying drawings, in which embodiments of the disclosure are shown. Like numbers refer to like elements throughout this specification. This specification does not describe all the components of the embodiments. General information in the technical field to which the present disclosure belongs is not described. Overlapping information between the embodiments is also not described. The terms "portion", "module", "member", and "block", as used herein, may be implemented as software or hardware. According to the embodiments, a plurality of "portions", "modules", "members", or "blocks" may be implemented as a single component, or a single "portion", "module", "member", or "block" may include a plurality of components.

Throughout this specification, when a part is "connected" to another part, this includes the case in which the part is indirectly connected to the other part, as well as the case in which the part is directly connected to the other part. Additionally, the indirect connection includes a connection through a wireless communication network.

Also, it should be understood that when the terms "includes," "comprises," "including," and/or "comprising," are used in this specification, the terms specify the presence of a stated component but do not preclude the presence or addition of one or more other components.

It should be understood that, although the terms first, second, and the like may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description without describing the order of the operations. The operations can be executed in a different order from the stated order unless a specific order is definitely specified in the context.

Hereinafter, the operation principle and embodiments of the present disclosure are described with reference to the accompanying drawings.

Figure 1:
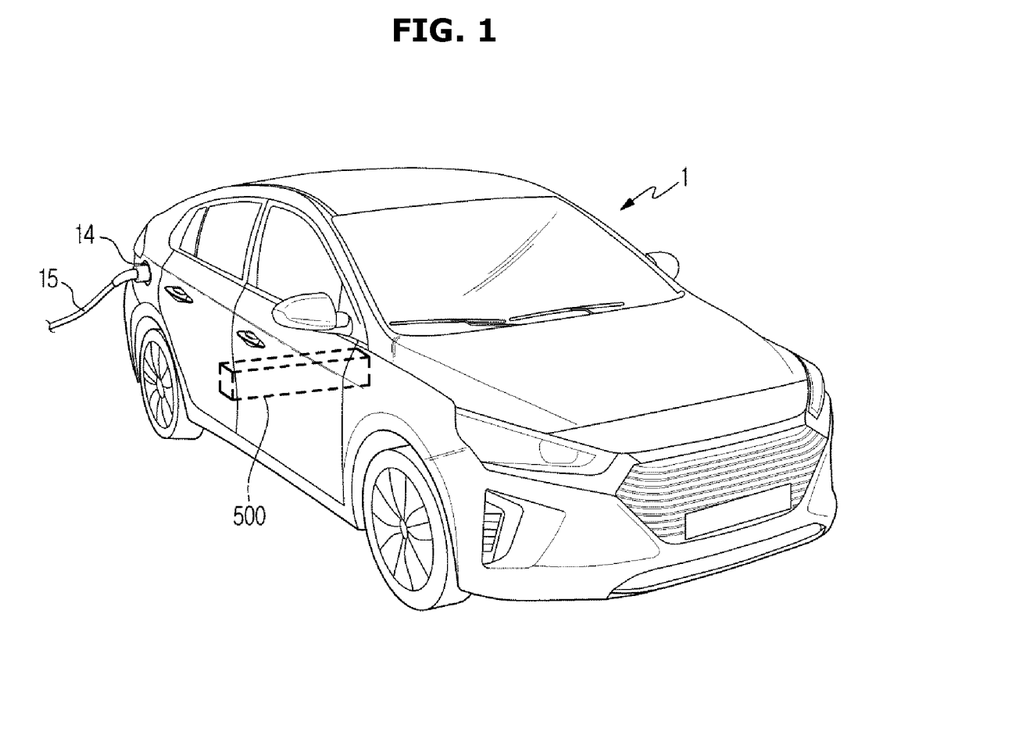
FIG. 1 shows an exterior of a vehicle according to an embodiment of the present disclosure.
Figure 2:
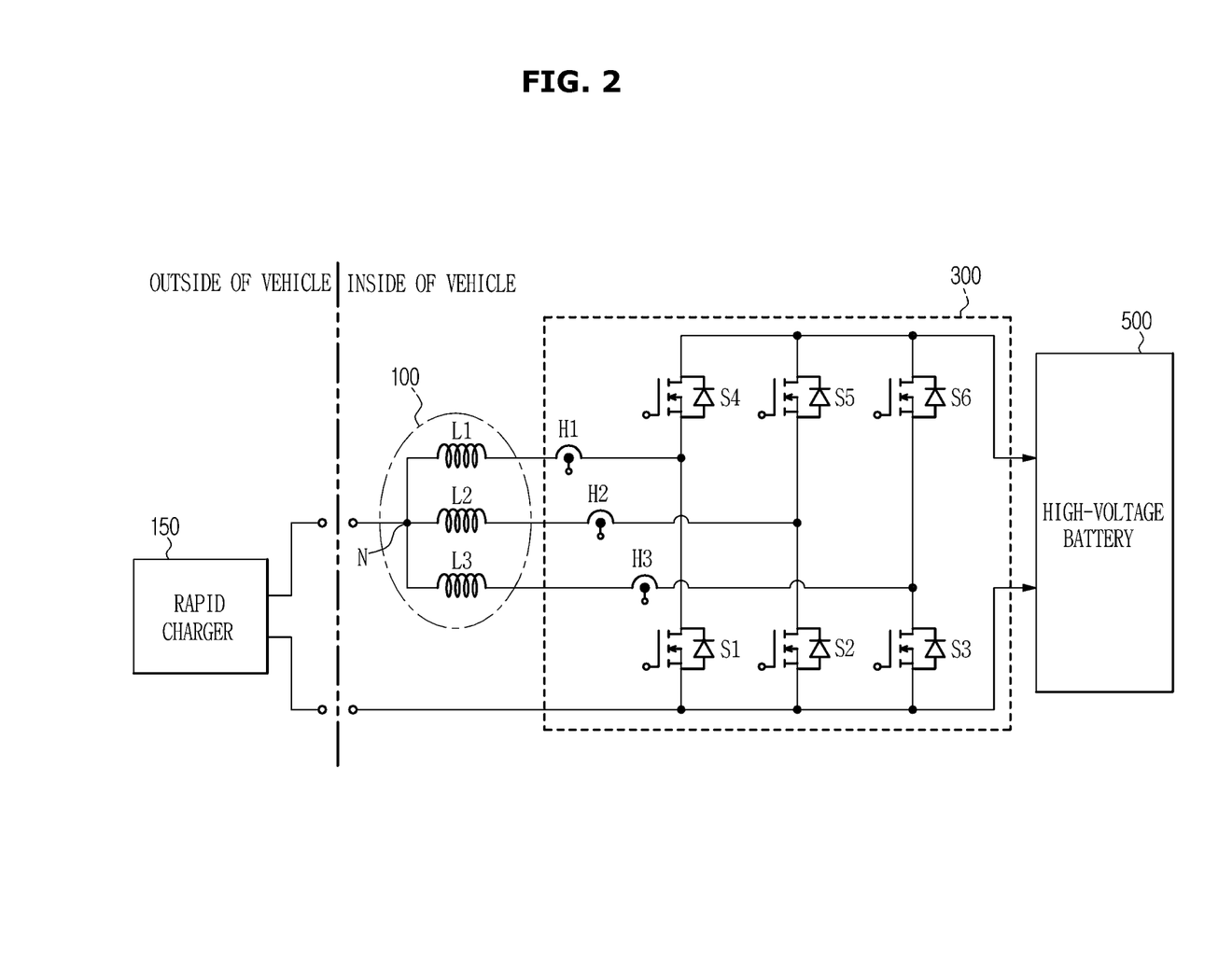
FIG. 2 shows an interior of a vehicle according to an embodiment of the present disclosure.

FIG. 1 shows an outer appearance of a vehicle according to an embodiment of the present disclosure. FIG. 2 shows a configuration related to a battery in a vehicle according to an embodiment of the present disclosure.

Referring to FIGS. 1 and 2, a vehicle 1 according to an embodiment may be a vehicle using electric energy as a main energy source. The vehicle may include a motor 100 and a high-voltage battery 500 to store power for driving the motor 100.

General internal-combustion engine vehicles include an auxiliary battery for supplying electric energy to electric parts in an engine room. However, the vehicle 1 using electric energy requires a large-capacity high-voltage battery 500 of a large size.

In the vehicle 1 according to an embodiment, the high-voltage battery 500 may be installed below a second-row passenger seat. The power stored in the high-voltage battery 500 may be used to drive the motor 100 to generate power. The high-voltage battery 500 may be a lithium battery.

The electric vehicle 1 may include a charging port 14. A charging connector 15 of a charging facility may be connected to the charging port 14. When electric energy is supplied through the charging connector 15, the high-voltage battery 500 may be charged.

Various types of external chargers including a rapid charger 150 may be used to charge the high-voltage battery 500 of the vehicle 1.

The rapid charger 150 may include a commercial rapid charger capable of charging the high-voltage battery 500 with a Direct-Current (DC) voltage of 400V. The rapid charger 150 may further include a high-voltage rapid charger capable of charging the high-voltage battery 500 with a high DC voltage of 800V.

In order to charge the high-voltage battery 500, the rapid charger 150 may convert commercial Alternating-Current (AC) power to a DC voltage of 400V or 800V. The rapid charger 150 may also supply the DC voltage to the vehicle 1.

The high-voltage battery 500 may have a charging voltage of 500V to 800V. However, there is a case in which a voltage capacity of the high-voltage battery 500 is different from that of the rapid charger 150. In this case, a compatibility problem may occur.

In order to overcome the compatibility problem between the high-voltage battery 500 and the rapid charger 150, the motor 100 and an inverter 300 may be disposed between an output terminal of the rapid charger 150 and the high-voltage battery 500 in the vehicle 1 to boost a voltage.

More specifically, when a voltage of the rapid charger 150 is too low to charge the high-voltage battery 500, the voltage supplied from the rapid charger 150 may be boosted to a level that is sufficient to charge the high-voltage battery 500.

To accomplish this, the motor 100 and the inverter 300 may function as a boost converter. Additionally, coils of the motor 100 may be inductors L1, L2, and L3. The inverter 300 may include a plurality of switches S1, S2, S3, S4, S5, and S6.

A combination of the inductors L1, L2, and L3 of the motor 100 and the switches S1, S2, S3, S4, S5, and S6 of the inverter 300 may constitute a booster circuit to boost an input voltage to a level that is sufficient to charge the high-voltage battery 500.

When a voltage supplied from the external rapid charger 150 is applied to a neutral point N of windings of the motor 100, the inductors L1, L2, and L3 of the motor 100 and the switches S1, S2, S3, S4, S5, and S6 of the inverter 300 may form groups to function as a boost converter.

More specifically, the inductor L1 and the switches S1 and S4 may form a group to boost an input voltage. Also, the inductor L2 and the switches S2 and S5 may form another group, and the inductor L3 and the switches S3 and S6 may form another group so as to operate in the same manner as the group of the inductor L1 and the switches S1 and S4. The switches S1 and S4, S2 and S5, and S3 and S6 disposed in pairs may be alternately turned on/off.

Meanwhile, when the high-voltage battery 500 is charged through the rapid charger 150, the vehicle 1 may not travel and the motor 100 may not be driven. Accordingly, a rotor (120 of FIG. 4) of the motor 100 may also be in a stop state.

At this time, magnetic resistance passing through the rotor 120 in a three-phase coil of the motor 100 may change depending on a position of the rotor 120. As the magnetic resistance changes, the inductance of the windings may change accordingly. When the current for charging flows through the windings, unintended torque and torque ripples may be generated in the rotor 120.

The unintended torque and torque ripples may cause vibrations and noise of the vehicle 1 when the high-voltage battery 500 of the vehicle 1 is charged.

The vehicle 1 according to an embodiment may reduce vibrations and noise generated when the high-voltage battery 500 is charged, in consideration of the stop state of the motor 100. Hereinafter, a configuration and operations of the vehicle 1 according to an embodiment will be described in detail.

Figure 3:
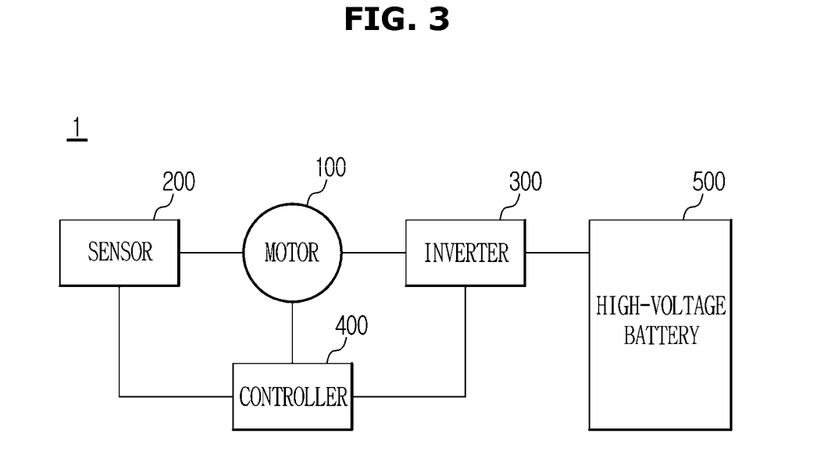
FIG. 3 is a control block diagram of a vehicle according to an embodiment of the present disclosure.
Figure 4:
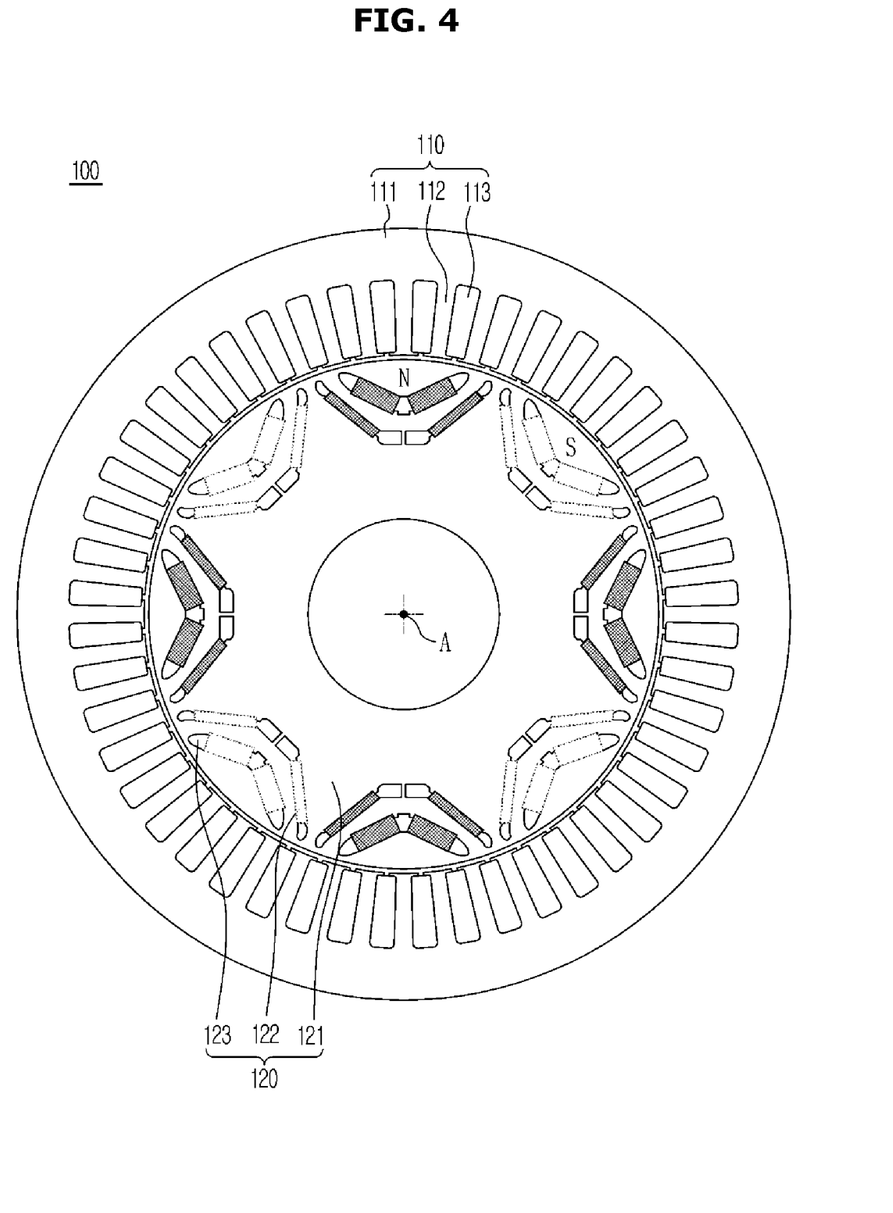
FIG. 4 shows a configuration of a motor of a vehicle according to an embodiment of the present disclosure.

FIG. 3 is a control block diagram of a vehicle according to an embodiment of the present disclosure. FIG. 4 shows a configuration of a motor of a vehicle according to an embodiment of the present disclosure.

Referring to FIG. 3, the vehicle 1 according to an embodiment may include the motor 100 configured to generate kinetic energy and electric energy, the inverter 300 configured to drive the motor 100 and the high-voltage battery 500 configured to store electric energy. The vehicle 1 may further include a controller 400 configured to control the charging of the high-voltage battery 500 and a sensor 200.

The high-voltage battery 500 may store electric energy. The high-voltage battery 500 may receive the electric energy from an external power source or from the motor 100. When receiving electric energy from the motor 100, the high-voltage battery 500 may receive electric energy generated by regenerative breaking of the vehicle 1.

The inverter 300 may supply driving current to the motor 100. More specifically, the inverter 300 may change a voltage and a frequency of the received power. The inverter 300 may also supply the changed voltage and frequency to the motor 100, thereby controlling the motor 100.

Also, the inverter 300 may output three-phase AC power required for driving the motor 100 from a DC voltage. The inverter 300 may include a plurality of switches (S1, S2, S3, S4, S5, and S6 of FIG. 2) to allow or block the flow of current. Therefore, alternating current is supplied to the motor 100 by switching operations of the plurality of switches S1, S2, S3, S4, S5, and S6.

When an external voltage is applied to charge the high-voltage battery 500, the plurality of switches S1, S2, S3, S4, S5, and S6 of the inverter 300 may boost the applied voltage to a level that is sufficient to charge the high-voltage battery 500 together with the inductors (L1, L2, and L3 of FIG. 2) of the motor 100.

The sensor 200 may measure a position of the rotor 120 of the motor 100 and detect an absolute position of the rotor 120. In order to detect the absolute position of the rotor 120, the sensor 200 may be implemented as a position sensor including a resolver, and the like.

As shown in FIG. 3, the sensor 200 may be provided as a separate component independently from the motor 100. However, the sensor 200 may be included in the motor 100.

The motor 100 may generate kinetic energy and electric energy. Additionally, the motor 100 may convert electric energy to kinetic energy (torque) or kinetic energy (torque) to electric energy. Due to the operation of the motor 100, when the vehicle 1 travels on a downhill road or decelerates (regenerative braking), the motor 100 can produce power. The power produced by the motor 100 may be charged in the high-voltage battery 500.

As described above, when the motor 100 is not driven to charge the high-voltage battery 500, the coils of the motor 100 may configure the inductors L1, L2, and L3 to boost an applied voltage.

Referring to FIG. 4, the motor 100 of the vehicle 1 according to an embodiment may include a stator 110 fixed by an external support structure and a rotor 120 rotating by magnetic interactions with the stator 110. The motor 100 may also include a rotating shaft A to transfer the torque of the rotor 120 to an external load.

Also, the motor 100 according to an embodiment may be an inner type motor in which the rotor 120 has a cylindrical shape. In this embodiment, the rotor 120 is located in the inside of the stator 110 in a cylindrical shape and rotates.

The stator 110 may be in the shape of a cylinder having a cavity. The rotor 120 may be inserted into the cavity of the stator 110 in such a way to rotate in the cavity of the stator 110.

The stator 110 may include, as shown in FIG. 4, a ring-shaped stator main body 111. The stator 110 may also include teeth 112 protruding from the stator main body 111 toward the rotating shaft A. The stator 110 may further include a coil (not shown) wound around the outer surface of the teeth 112.

The stator main body 111 may be in the shape of a cylinder and may be fixed on an inner surface of a motor case (not shown).

The teeth 112 may protrude radially from an inner circumferential surface of the stator main body 111 toward the rotor 120. The teeth 112 may be integrated into the stator main body 111.

The stator main body 111 and the teeth 112 may be formed by stacking metal plates having the shapes of the stator main body 111 and the teeth 112 toward the rotating shaft A.

Pieces of the teeth 112 may be arranged at equidistant intervals along the inner circumferential surface of the stator main body 111. A plurality of slots 113 may be formed between the teeth 112 such that each slot 113 is formed between two neighboring teeth 112. Through the slots 113 formed between the teeth 112, windings may be wound along the outer surfaces of the teeth 112 so as to form the coil (not shown).

The coil (not shown) may be formed by windings made of an electrically conductive material that are wound along the outer surfaces of the teeth 112. When current passes through the coil (not shown), a magnetic field may be formed in the inside of the coil (not shown), or in other words, the teeth 112, in a direction that is perpendicular to the sections of the teeth 112.

The motor 100 according to an embodiment may include, as shown in FIG. 4, 48 teeth 112 and 48 slots 113.

The rotor 120 may be disposed in the cavity of the rotor 110, as described above, and rotate on the rotating shaft A by magnetic interactions with the stator 110.

The rotor 120 may include, as shown in FIG. 4, a rotor main body 121 in a cylindrical shape, and a plurality of permanent magnet groups 122 disposed in the inside of the rotor main body 121. Also, in the rotor main body 121, a flux barrier group 123 may be formed adjacent to each permanent magnet group 122.

As such, since the rotor 120 includes the permanent magnet groups 122 therein, the motor 100 according to an embodiment may be a Permanent Magnet (PM) motor. More specifically, the motor 100 according to an embodiment may be an Interior Permanent Magnet (IPM) motor in which the permanent magnet groups 122 are buried in the inside of the rotor main body 121.

The rotor main body 121 may be in the shape of a cylinder whose center is the rotating shaft A. The rotor main body 121 may be made of a magnetic substance that is magnetized by a magnetic field. The rotor main body 121 may be manufactured by stacking metal plates having the shape of the rotor main body 121, as shown in FIG. 4.

The neighboring permanent magnet groups 122 may be disposed such that different magnetisms face outward from the rotor main body 121. For example, an N pole and an S pole may be alternately arranged along the circumferential surface of the rotor main body 121.

The flux barrier group 123 may include a plurality of flux barriers made of a nonmagnetic material interfering with flux generated by the permanent magnet groups 122. For example, by forming holes at locations corresponding to the flux barrier groups 123, flux barriers interfering with flux may be formed.

A magnetic force may interact between the stator 110 and the rotor 120 of the motor 100. Due to the magnetic force, when the high-voltage battery 500 is charged through the rapid charger 150, unintended torque and torque ripples may be generated by the stop position of the rotor 120. Accordingly, it is necessary to control the stop position of the rotor 120.

In order to control the stop position of the rotor 120, the controller 400 may change the position of the rotor 120 based on whether the position of the rotor 120 is identical to a predetermined position. The controller 400 may then control the inverter 300 such that the high-voltage battery 500 is charged after the position of the rotor 120 changes.

Herein, the predetermined position may be a position at which cogging torque generated by the motor 100 is smallest, or a position at which torque ripples generated by the motor 100 are smallest. Also, the predetermined position may be the center of the windings of the stator 110.

Hereinafter, operations of the controller 400 will be described with reference to FIGS. 5 and 6.

Figure 5A:
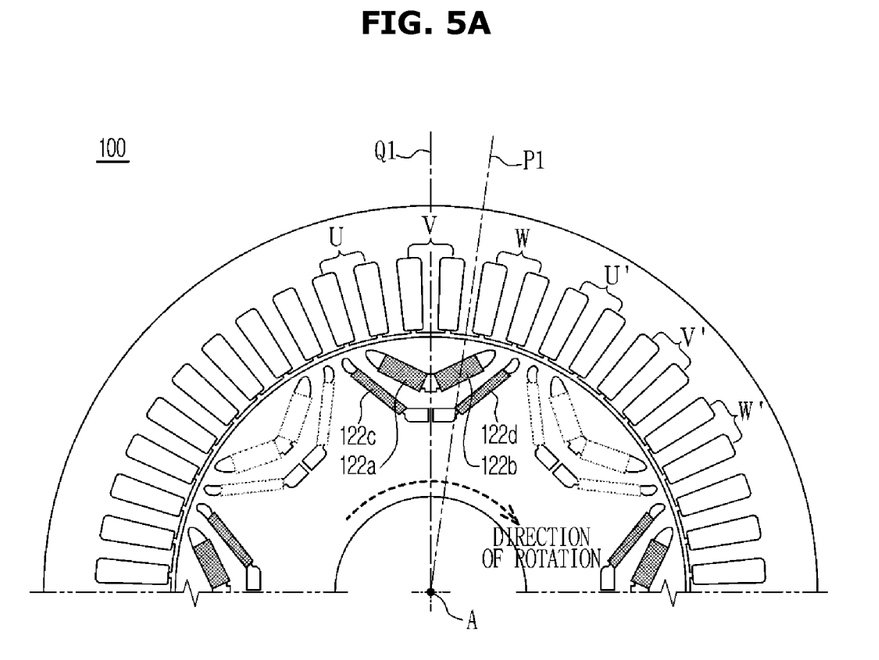
FIGS. 5A and 5B show a part of a section of a motor of a vehicle according to an embodiment of the present disclosure.
Figure 5B:
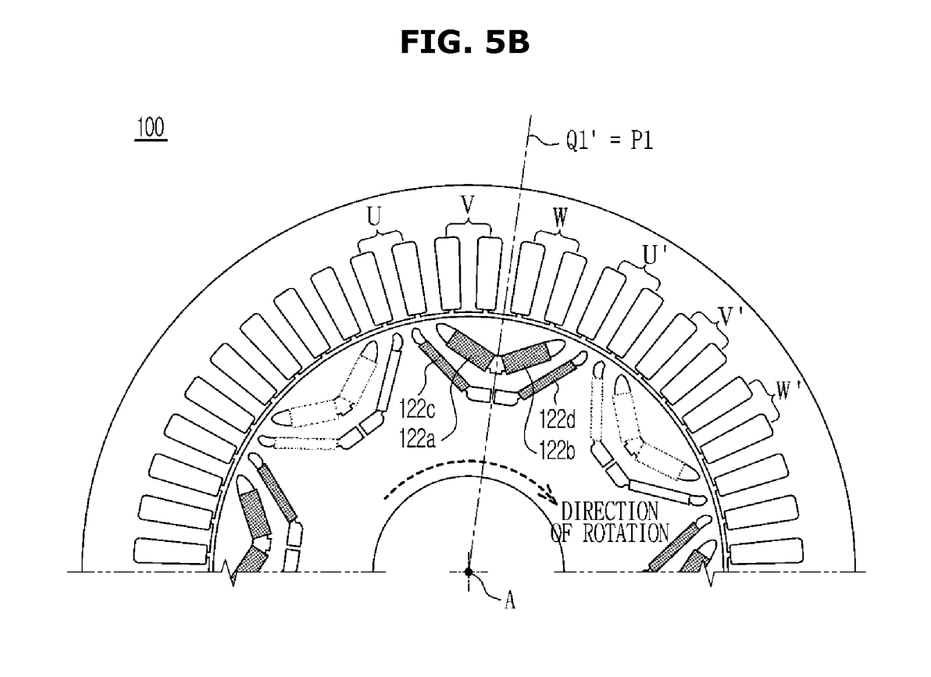

FIGS. 5A and 5B show a part of a section of a motor of a vehicle according to an embodiment of the present disclosure. FIG. 6 is a graph showing torque and torque ripples generated by a motor of a vehicle according to an embodiment of the present disclosure.

Referring to FIG. 5A, the rotor 120 of the motor 100 may include a first permanent magnet 122a, a second permanent magnet 122b, a third permanent magnet 122c and a fourth permanent magnet 122d.

The plurality of permanent magnets 122a, 122b, 122c and 122d may form a group to form a magnetic field and may also form a pole.

The center of the pole may be the center of the permanent magnets 122a, 122b, 122c and 122d forming the pole. Also, the center of the pole may be represented by a straight line Q1 from the center of the rotating shaft A toward the pole formed along the circumferential surface of the rotor main body 121. The center of the pole may be represented as a point at which the straight line Q1 meets the circumferential surface of the rotor main body 121.

Windings wound along the outer surfaces of the teeth 112 arranged along the inner circumferential surface of the stator main body 111 may be represented as three-phase windings of U, V, and W phases.

The center of the windings of the stator 110 may be a midway point of the three phases. More specifically, the center of the windings of the stator 110 may be a middle point of U phase-U' phase, a middle point of V phase-V' phase, and a middle point of W phase-W phase.

For example, the center of U phase-U' phase of the stator 110 may be represented by a straight line P1 from the center of the rotating shaft A toward the inner circumferential surface of the stator main body 111 and may be represented as a point at which the straight line P1 meets the inner circumferential surface of the stator 110.

As shown in FIG. 5A, if charging starts when the position of the rotor 120 is on the straight line Q1 and the position of the winding center of each phase of the stator 110 is on the straight line P1, magnetic resistance passing through the rotor 120 in the three-phase coil may change by a magnetic interaction between the rotor 120 and the stator 110.

In this case, inductance of each phase may change. When current for charging flows through each phase, unintended cogging torque may be generated in the rotor 120.

The cogging torque is pulsed torque generated to maintain a position at which magnetic resistance is smallest in a magnetic circuit configured with permanent magnets of a rotor, teeth of a stator, and gaps. The cogging torque becomes the cause of torque ripples when a motor operates.

Figure 6:
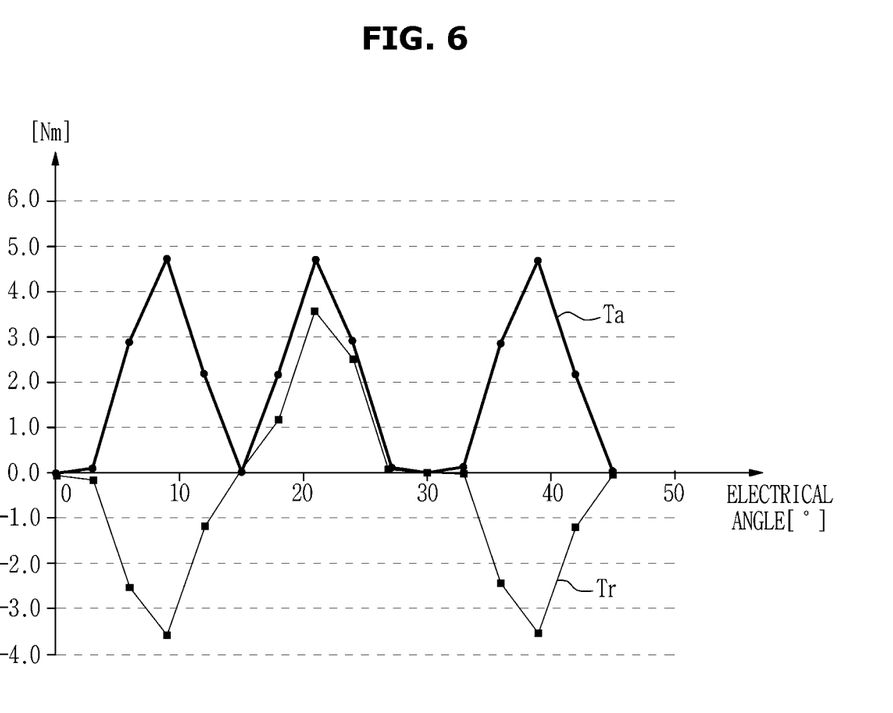
FIG. 6 is a graph showing a torque and torque ripples generated by a motor of a vehicle according to an embodiment of the present disclosure.

Referring to FIG. 6, in the case of FIG. 5A, since average torque Ta and torque ripples Tr are maximum, vibrations and noise may be generated in the vehicle 1 when the high-voltage battery 500 is charged by using the motor 100 and the inverter 300.

Accordingly, when the position of the rotor 120 is not identical to a predetermined position, or in other words, a position at which cogging torque and torque ripples are smallest, the controller 400 may change the position of the rotor 120 to the predetermined position.

Also, the controller 400 may control the inverter 300 such that the high-voltage battery 500 is charged after the position of the rotor 120 changes to the predetermined position.

Referring to FIG. 5B, the controller 400 may issue a control command for rotating the rotor 120 such that the position of the rotor 120, or in other words, the center of the permanent magnets 122a, 122b, 122c and 122d forming a pole is on a straight line Q1'.

At this time, the controller 400 may rotate the rotor 120 in a clockwise direction or in a counterclockwise direction.

In this case, the position Q1' of the rotor 120 may be identical to the middle point P1 of the U phase-U' phase of the stator 110. At this time, the average torque Ta and torque ripples Tr generated by the motor 100 may become minimum.

According to an embodiment of the present disclosure, FIG. 6 is a graph showing a torque and torque ripples when the motor 100 is an 8-pole 48-slot motor. Referring to FIG. 6, it is seen that when the position of the rotor 120, in other words, the center of the pole is a multiple (15 degrees, 30 degrees, 45 degrees) of an electrical angle of 15 degrees upon charging with three-phase in-phase current, average torque Ta and torque ripples Tr have minimum magnitudes.

Accordingly, the controller 400 may change the position of the rotor 120 such that the torque Ta and the torque ripples Tr generated by the motor 100 have minimum magnitudes. Additionally, the controller 400 may control the inverter 300 such that charging is performed using the motor 100 and the inverter 300 after the position of the rotor 120 changes.

Accordingly, when the high-voltage battery 500 is charged using the motor 100 and the inverter 300, vibrations and noise generated in the vehicle 1 can be reduced.

The controller 400 according to another embodiment of the present disclosure may recognize the position of the rotor 120 as an absolute position of the rotor 120 sensed by the sensor 200.

In this case, the controller 400 may change the position of the rotor 120 such that the absolute position of the rotor 120 sensed by the sensor 200 is identical to the predetermined position, in other words, the winding center of each phase of the stator 110.

Also, the controller 400 may control the inverter 300 such that the high-voltage battery 500 is charged after changing the position of the rotor 120 such that the absolute position of the rotor 120 sensed by the sensor 200 is identical to the winding center of each phase of the stator 110.

Figure 7:
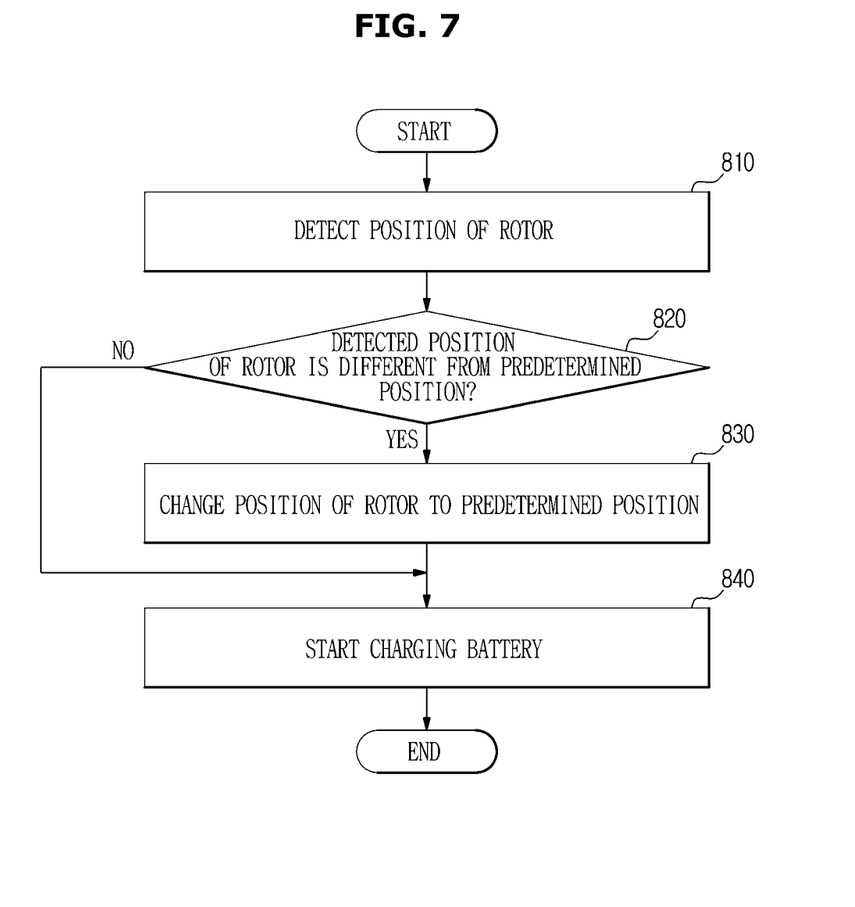
FIG. 7 is a flowchart illustrating a method of controlling a vehicle according to an embodiment of the present disclosure.

FIG. 7 is a flowchart illustrating a method of controlling a vehicle according to an embodiment of the present disclosure.

The vehicle 1, according to an embodiment, may detect a position of the rotor 120 in operation 810. The position of the rotor 200 may be detected by the sensor 200. The position of the rotor 120 may be detected as the center of a pole of the rotor 120.

After detecting the position of the rotor 120, the controller 400 may determine whether the detected position of the rotor 120 is different from a predetermined position in operation 820. In this case, the predetermined position may be a position at which the cogging torque and torque ripples generated by the motor 100 are smallest or may be the winding center of each phase of the stator 110.

If the detected position of the rotor 120 is different from the predetermined position, the controller 400 may change the position of the rotor 120 to the predetermined position in operation 830. In order to change the position of the rotor 120 to the predetermined position, the controller 400 may issue a control command for rotating the rotor 120 of the motor 100.

After the position of the rotor 120 is changed to the predetermined position, the controller 400 may control the inverter 300 to start charging the high-voltage battery 500 in the vehicle 1 in operation 840. At this time, if a voltage applied by the external rapid charger 150 is not a level that is appropriate to charge the high-voltage battery 500, the controller 400 may boost the voltage using the inverter 300 and the coil of the motor 100.

In the vehicle according to an aspect and the control method thereof, it is possible to reduce noise and vibrations that may be generated when the battery is charged by a charger of a charging facility, while increasing the efficiency of charging.

Although several embodiments of the present disclosure have been shown and described, those having ordinary skill in the art should understand that the disclosure is not limited to the disclosed embodiments. On the contrary, this disclosure is intended to cover various modifications without departing from the principles and spirit of the disclosure, the scope of which is defined in the claims and their equivalents.

What is claimed is:

1. A vehicle comprising:
   a driving motor including a stator and a rotor;
   an inverter configured to drive the driving motor;
   a battery which is rechargeable;
   a sensor configured to detect a position of the rotor; and a controller configured to change the position of the rotor based on whether the position of the rotor detected by the sensor is identical to a predetermined position, and to control the inverter such that the battery is charged after the position of the rotor changes.

2. The vehicle according to claim 1,
wherein, if the position of the rotor detected by the sensor is not identical to the predetermined position, the controller changes the position of the rotor such that the position of the rotor is identical to the predetermined position, and controls the inverter such that the battery is charged after the position of the rotor changes.

3. The vehicle according to claim 2, wherein if the position of the rotor detected by the sensor is not identical to a winding center of each phase of the stator, the controller changes the position of the rotor such that the position of the rotor is identical to the winding center of each phase of the stator, and controls the inverter such that the battery is charged after the position of the rotor changes.

4. The vehicle according to claim 2, wherein if the position of the rotor detected by the sensor is not identical to a position at which a cogging torque generated by the driving motor is smallest, the controller changes the position of the rotor such that the position of the rotor is identical to the position at which the cogging torque generated by the driving motor is smallest, and controls the inverter such that the battery is charged after the position of the rotor changes.

5. The vehicle according to claim 2, wherein if the position of the rotor detected by the sensor is not identical to a position at which torque ripples generated by the driving motor are smallest, the controller changes the position of the rotor such that the position of the rotor is not identical to the position at which the torque ripples generated by the driving motor are smallest, and controls the inverter such that the battery is charged after the position of the rotor changes.

6. The vehicle according to claim 1, wherein if a center position of a pole of the rotor is not identical to the predetermined position, the controller changes the position of the rotor such that the center position of the pole of the rotor is identical to the predetermined position, and controls the inverter such that the battery is charged after the position of the rotor changes.

7. The vehicle according to claim 6, wherein if the center position of the pole of the rotor is not identical to a winding center of each phase of the stator, the controller changes the position of the rotor such that the center position of the pole of the rotor is identical to the winding center of each phase of the stator, and controls the inverter such that the battery is charged after the position of the rotor changes.

8. The vehicle according to claim 6, wherein if the center position of the pole of the rotor is not identical to a position at which a cogging torque generated by the driving motor is smallest, the controller changes the position of the rotor such that the center position of the pole of the rotor is identical to the position at which the cogging torque generated by the driving motor is smallest, and controls the inverter such that the battery is charged after the position of the rotor changes.

9. The vehicle according to claim 6, wherein if the center position of the pole of the rotor is not identical to a position at which torque ripples generated by the driving motor are smallest, the controller changes the position of the rotor such that the center position of the pole of the rotor is identical to the position at which the torque ripples generated by the driving motor are smallest, and controls the inverter such that the battery is charged after the position of the rotor changes.

10. The vehicle according to claim 6, wherein if the rotor stops and a voltage for charging is applied to a neutral point of windings of the driving motor, the controller controls the inverter to boost the applied voltage using the driving motor and the inverter.

11. A method of controlling a vehicle, comprising:
detecting a position of a rotor;
changing the position of the rotor based on whether the detected position of the rotor is identical to a predetermined position; and
starting a charging of a battery after the position of the rotor changes.

12. The method of claim 11, wherein the changing of the position of the rotor comprises, if the position of the rotor is not identical to the predetermined position, changing the position of the rotor such that the position of the rotor is identical to the predetermined position.

13. The method of claim 12, wherein the changing of the position of the rotor comprises, if the position of the rotor is not identical to a winding center of each phase of a stator, changing the position of the rotor such that the position of the rotor is identical to the winding center of each phase of the stator.

14. The method of claim 12, wherein the changing of the position of the rotor comprises, if the position of the rotor is not identical to a position at which a cogging torque generated by a driving motor is smallest, changing the position of the rotor such that the position of the rotor is identical to the position at which the cogging torque generated by the driving motor is smallest.

15. The method of claim 12, wherein the changing of the position of the rotor comprises, if the position of the rotor is not identical to a position at which torque ripples generated by a driving motor are smallest, changing the position of the rotor such that the position of the rotor is identical to the position at which the torque ripples generated by the driving motor are smallest.

16. The method of claim 11, wherein the detecting of the position of the rotor comprises detecting a center position of a pole of the rotor, and
the changing of the position of the rotor comprises if the center position of the pole of the rotor is not identical to the predetermined position, changing the position of the rotor such that the center position of the pole of the rotor is identical to the predetermined position.

17. The method of claim 16, wherein the changing of the position of the rotor comprises, if the center position of the pole of the rotor is not identical to a winding center of each phase of a stator, changing the position of the rotor such that the center position of the pole of the rotor is identical to the winding center of each phase of the stator.

18. The method of claim 16, wherein the changing of the position of the rotor comprises, if the center position of the pole of the rotor is not identical to a position at which a cogging torque generated by the driving motor is smallest, changing the position of the rotor such that the center position of the pole of the rotor is identical to the position at which the cogging torque generated by the driving motor is smallest.

19. The method of claim 16, wherein the changing of the position of the rotor comprises, if the center position of the pole of the rotor is not identical to a position at which torque ripples generated by the driving motor are smallest, changing the position of the rotor such that the center position of the pole of the rotor is identical to the position at which the torque ripples generated by the driving motor are smallest.

20. The method of claim 11, wherein the starting of the charging of the battery comprises:
  stopping the rotor, and applying a voltage for charging to a neutral point of windings of a driving motor; and
  boosting the applied voltage using the driving motor and an inverter.

* * * * *